(12) United States Patent
Yamamoto et al.

(10) Patent No.: US 10,033,057 B2
(45) Date of Patent: Jul. 24, 2018

(54) FUEL CELL SYSTEM AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 25 days.

(21) Appl. No.: 14/931,190

(22) Filed: Nov. 3, 2015

(65) Prior Publication Data

US 2016/0133970 A1     May 12, 2016

(30) Foreign Application Priority Data

Nov. 12, 2014   (JP) .................................. 2014-229445

(51) Int. Cl.
*H01M 8/04*        (2016.01)
*H01M 8/04746*     (2016.01)
(Continued)

(52) U.S. Cl.
CPC ... *H01M 8/04753* (2013.01); *H01M 8/04388* (2013.01); *H01M 8/04589* (2013.01);
(Continued)

(58) Field of Classification Search
CPC ......... H01M 8/04753; H01M 8/04992; H01M 8/04402; H01M 8/04589; H01M 8/04388
(Continued)

(56) References Cited

U.S. PATENT DOCUMENTS

| 2005/0053814 A1 | 3/2005 | Imamura et al. |
| 2007/0196709 A1 | 8/2007 | Umayahara et al. |

(Continued)

FOREIGN PATENT DOCUMENTS

| EP | 1 203 418 B1 | 5/2002 |
| JP | 2005-166498 A | 6/2005 |

(Continued)

OTHER PUBLICATIONS

Office Acion issued in U.S. Appl. No. 14/938,590 dated May 17, 2017.

(Continued)

*Primary Examiner* — Osei K Amponsah
(74) *Attorney, Agent, or Firm* — Finnegan, Henderson, Farabow, Garrett & Dunner, LLP

(57) ABSTRACT

In order to provide a fuel cell system that inhibits the occurrence of degradation of an MEA while also inhibiting an increase in the CPU load. A fuel cell system is equipped with a hydrogen supply unit that supplies hydrogen to a fuel cell, a pressure detection unit that detects the internal pressure of hydrogen supply piping, a current detection unit that detects the current value of the fuel cell, and a control unit that calculates the necessary hydrogen supply volume for the fuel cell based on the detected current value and pressure value, and controls the hydrogen supply unit to supply hydrogen corresponding to the calculated hydrogen supply unit to the fuel cell, wherein the control unit calculates the hydrogen supply volume based on the pressure value and the current value for each of a first cycle, and acquires the pressure value and supplies hydrogen corresponding to the immediately prior calculated hydrogen supply volume to the fuel cell when the control unit is determined that supply of hydrogen is necessary based on (Continued)

the acquired pressure value, for each of a second cycle which shorter than the first cycle.

5 Claims, 6 Drawing Sheets

(51) Int. Cl.
*H01M 8/04992* (2016.01)
*H01M 8/0438* (2016.01)
*H01M 8/04537* (2016.01)
*H01M 8/1018* (2016.01)

(52) U.S. Cl.
CPC .... *H01M 8/04992* (2013.01); *H01M 8/04402* (2013.01); *H01M 2008/1095* (2013.01); *H01M 2250/20* (2013.01); *Y02T 90/32* (2013.01)

(58) Field of Classification Search
USPC ........................................................ 429/444
See application file for complete search history.

(56) References Cited

U.S. PATENT DOCUMENTS

2009/0226783 A1 9/2009 Hasegawa
2010/0273081 A1 10/2010 Ishikawa

FOREIGN PATENT DOCUMENTS

| | | | |
|---|---|---|---|
| JP | 2005-302708 A | 10/2005 | |
| JP | 2005-339847 A | 12/2005 | |
| JP | 2007-172971 A | 7/2007 | |
| JP | 2007-305563 | * 11/2007 | ............. H01M 8/04 |
| JP | 2007-311304 | 11/2007 | |
| JP | 2008-103167 | 5/2008 | |
| JP | 2009-146618 A | 7/2009 | |
| JP | 2011-3507 | 1/2011 | |
| JP | 2011-138790 | 7/2011 | |
| JP | 2013-191369 | * 9/2013 | ............. H01M 8/04 |
| JP | 2014-102948 | 6/2014 | |
| KR | 10-2006-0124771 A | 12/2006 | |

OTHER PUBLICATIONS

Office Action issued in U.S. Appl. No. 14/935,590 dated Oct. 19. 2017.

Notice of Allowance issued in U.S. Appl. No. 14/935,590 dated Jan. 23, 2018.

Notice of Allowance issued in U.S. Appl. No. 14/935,590 dated Mar. 30, 2018.

* cited by examiner

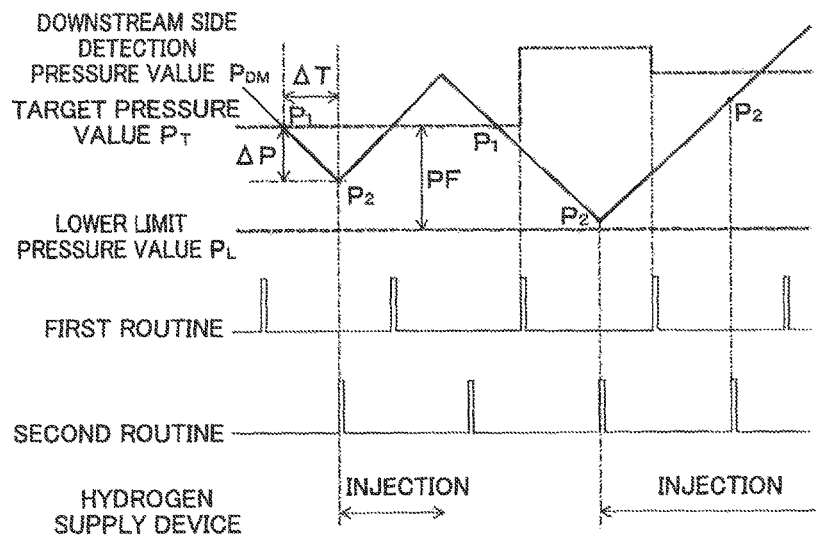
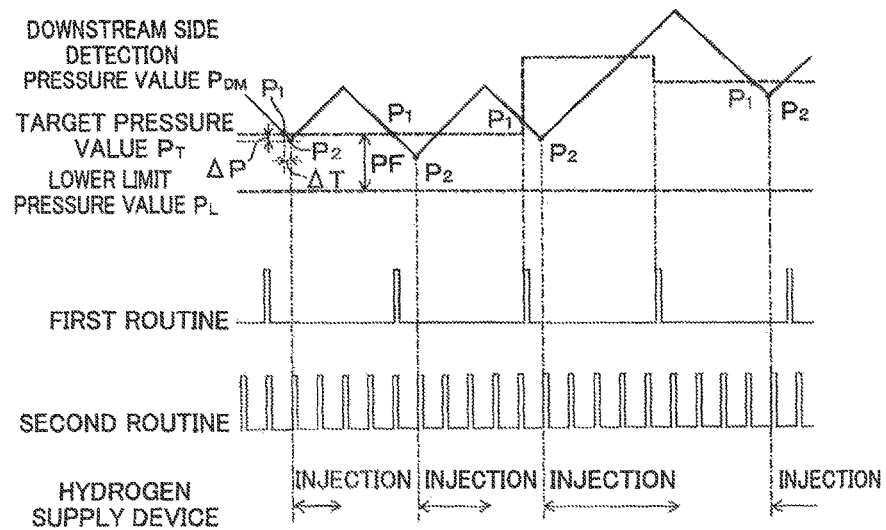

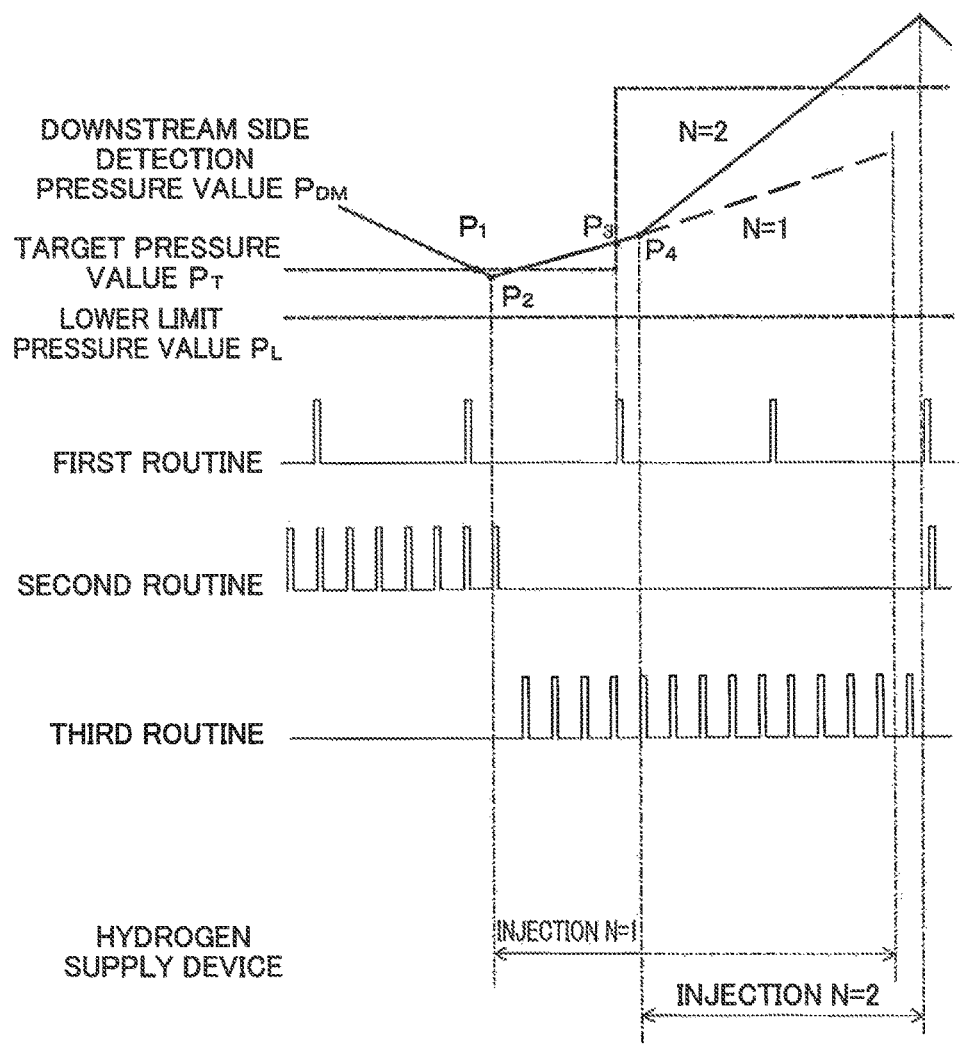

FUEL CELL SYSTEM AND CONTROL METHOD OF FUEL CELL SYSTEM

CROSS-REFERENCE TO RELATED APPLICATIONS

This application claims priority rights based on the Japanese patent application of Application No. 2014-229445 applied for on Nov. 12, 2014, and all the disclosures thereof are incorporated herein by reference.

BACKGROUND

The present invention relates to a fuel cell system, and a control method of fuel cell system.

From the past, an ECU (Electric Control Unit) for controlling a fuel cell system is known which calculates a hydrogen supply timing, supply volume, and supply time according to the internal pressure of a hydrogen gas supply flow path at designated calculation cycles (JP2014-102948A, JP2011-138790A, JP2011-003507A, JP2008-103167A, JP2007-311304A).

To more quickly detect changes in the state of a fuel cell system such as changes in the internal pressure of a hydrogen gas supply flow path or the like, and to perform control according to those changes, it is preferable to make the cycle for calculating the hydrogen supply timing, supply volume, and supply time shorter. When the ECU calculation cycle is long, for example when there is a rapid drop in the internal pressure of the hydrogen gas supply flow path, there are cases when degradation of the membrane electrode assembly (MEA) occurs. In such a situation, even if the internal pressure goes below a threshold volume, it takes time until that is detected. Accordingly the decrease in internal pressure progresses and a hydrogen deficient state continues. Because of the following events, however, when the cycle for calculating the hydrogen supply timing, supply volume, and supply time is made shorter, there was a separate problem of an increased load on the CPU (Central Processing Unit).

SUMMARY

The present invention was created to address the problems described above, and may be realized as the modes noted hereafter.

(1) With one mode of the present invention, a fuel cell is provided. This fuel cell is equipped with a fuel cell, a hydrogen supply unit that supplies hydrogen to the fuel cell via hydrogen supply piping, a pressure detection unit that detects a pressure value of the internal pressure of the hydrogen supply piping, a current detection unit that detects the current value of the power generation current of the fuel cell, and a control unit that calculates the necessary hydrogen supply volume for the fuel cell based on the detected current value and the pressure value, and controls the hydrogen supply unit to supply hydrogen corresponding to the calculated hydrogen supply volume to the fuel cell, wherein the control unit calculates the hydrogen supply volume based on the pressure value and the current value for each of a first cycle, and acquires the pressure value and supplies hydrogen corresponding to the immediately prior calculated hydrogen supply volume to the fuel cell when the control unit is determined that supply of hydrogen is necessary based on the acquired pressure value, for each of a second cycle which shorter than the first cycle. With this constitution, the calculation cycle performed for judging whether or not hydrogen supply is necessary for the fuel cell and the calculation cycle for calculating the necessary hydrogen supply volume are independent, so the calculation cycle for performing a judgment of whether or not supply of hydrogen is necessary is made relatively short, and it is possible to inhibit the occurrence of degradation of the MEA due to hydrogen deficiency. Meanwhile, the cycle for calculating the necessary hydrogen supply volume is made relatively long, and it is possible to inhibit an increase in the load of the CPU.

(2) With another mode of the present invention, a fuel cell system is provided. This fuel cell system is equipped with a fuel cell, a hydrogen supply unit that supplies hydrogen to the fuel cell via hydrogen supply piping, a pressure detection unit that detects a pressure value of the internal pressure of the hydrogen supply piping, a current detection unit that detects the current value of the power generation current of the fuel cell, and a control unit that executes a first routine for each of a first cycle, wherein the first routine acquires the current value and the pressure value, calculates the necessary hydrogen supply volume by the hydrogen supply unit from the acquired current value and pressure value, and updates the hydrogen supply volume stored in the storage unit using the calculated hydrogen supply volume, and executes a second routine for each of a second cycle which shorter than the first cycle, wherein the second routine acquires the pressure value, judges whether or not hydrogen supply by the hydrogen supply unit is necessary from the acquired pressure value, and when the control unit is judged that supply of hydrogen is necessary, acquires the hydrogen supply volume from the storage unit, and has the hydrogen supply unit start the supply of hydrogen corresponding to the acquired hydrogen supply volume. With this constitution, the calculation cycle for performing judgment of whether or not hydrogen supply is necessary to the hydrogen supply piping and the calculation cycle of calculating the necessary hydrogen supply volume are independent, so it is possible to make the calculation cycle that performs a judgment of whether or not the hydrogen supply is necessary relatively short, and to inhibit the occurrence of degradation of the MEA due to hydrogen deficiency. Meanwhile, it is possible to make the cycle for calculating the necessary hydrogen supply volume relatively long, and to inhibit an increase in the load of the CPU.

(3) With the fuel cell system may be constituted so that the control unit, with the first routine, calculates a target pressure value for the internal pressure of the hydrogen supply piping from the acquired current value, and updates the target pressure value stored in the storage unit using the calculated target pressure value, for each of the first cycle, and with the second routine, acquires the target pressure value from the storage unit, and judges whether or not hydrogen supply by the hydrogen supply unit is necessary based on whether or not the pressure value acquired from the pressure detection unit has gone below the acquired target pressure value, for each of the second cycle. With this constitution, the calculation cycle for performing a judgment of whether or not the internal pressure of the hydrogen supply piping has gone below the target pressure value and the calculation cycle for calculating the necessary hydrogen supply volume are independent, so it is possible to make the calculation cycle for performing judgment of whether or not the internal pressure of the hydrogen supply piping has gone below the target pressure value relatively short, and to set the target pressure value low. By doing this, it is possible to inhibit the occurrence of cross leaking.

(4) With the fuel cell system may be constituted so that with the second routine, when the pressure value acquired from the pressure detection unit goes below the acquired target pressure value, the control unit again acquires the pressure value and the target pressure value, and when the pressure value acquired again goes below the target pressure value acquired again, judges that hydrogen supply by the hydrogen supply unit is necessary. With this constitution, when the pressure value goes below the target pressure value due to a temporary fluctuation in internal pressure of the hydrogen supply piping, the hydrogen supply to the hydrogen supply piping is regulated. By doing this, it is possible to inhibit excessive supply of hydrogen to the hydrogen supply piping.

(5) With the fuel cell system may be constituted so that when the control unit has the hydrogen supply unit execute supplying of hydrogen corresponding to a first hydrogen supply volume acquired from the storage unit, the control unit executes a third routine for each of a third cycle which is shorter than the first cycle, wherein with the third routine, the control unit acquires the hydrogen supply volume from the storage unit, judges whether or not a second hydrogen supply volume which is the acquired hydrogen supply volume has changed by a preset threshold value or greater in relation to the first hydrogen supply volume, and when the control unit is judged that the second hydrogen supply volume has changed by the threshold value or greater, even if the supply of hydrogen corresponding to the first hydrogen supply volume by the hydrogen supply unit is not completed, the control unit has the hydrogen supply unit start supply of hydrogen corresponding to the second hydrogen supply volume. With this constitution, when exponential fluctuation in internal pressure of the hydrogen supply piping after starting the supply of hydrogen by the hydrogen supply unit, it is possible to perform supply of hydrogen corresponding to the internal pressure after changing promptly. By doing this, for example, when there is a rapid drop in the internal pressure of the hydrogen supply piping, it is possible to inhibit the occurrence of a hydrogen deficiency because there is not enough hydrogen supply volume.

(6) With another mode of the present invention, a control method of a fuel cell system equipped with a hydrogen supply unit that supplies hydrogen to a fuel cell via hydrogen supply piping is provided. This control method is constituted so as to acquire a current value of the power generation current of the fuel cell and a pressure value of the internal pressure of the hydrogen supply piping, calculate the necessary hydrogen supply volume by the hydrogen supply unit from the acquired current value and pressure value, and update the hydrogen supply volume stored in the storage unit using the calculated hydrogen supply volume, for each of a first cycle, and so as to acquire the pressure value, judge whether or not hydrogen supply by the hydrogen supply unit is necessary from the acquired pressure value, and when it is judged that the hydrogen supply is necessary, acquire the hydrogen supply volume from the storage unit, and have the hydrogen supply unit start supplying hydrogen corresponding to the acquired hydrogen supply volume, for each of a second cycle which shorter than the first cycle. With this constitution, the calculation cycle for performing the judgment of whether or not hydrogen supply is necessary to the hydrogen supply piping and the calculation cycle for calculating the necessary hydrogen supply volume are independent, so it is possible to make the calculation cycle for performing judgment of whether or not hydrogen supply is necessary relatively short, and to inhibit the occurrence of the degradation of the MEA due to hydrogen deficiency. Meanwhile, it is possible to make the cycle for calculating the necessary hydrogen supply volume relatively long, and to inhibit an increase in the load of the CPU.

The present invention may be realized in various modes, and for example, may be realized in modes such as a vehicle in which the fuel cell system is mounted, a method of supplying hydrogen to a fuel cell, a computer program that realizes a fuel cell control method, a recording medium on which that computer program is recorded and the like.

BRIEF DESCRIPTION OF THE DRAWINGS

FIG. 4A is a drawing for describing an example of the effect of the first embodiment.

FIG. 4B is a drawing for describing an example of the effect of the first embodiment.

FIG. 8 is a drawing for describing an example of the effects of the third embodiment.

DESCRIPTION OF THE EMBODIMENTS

A. First Embodiment

Figure 1:
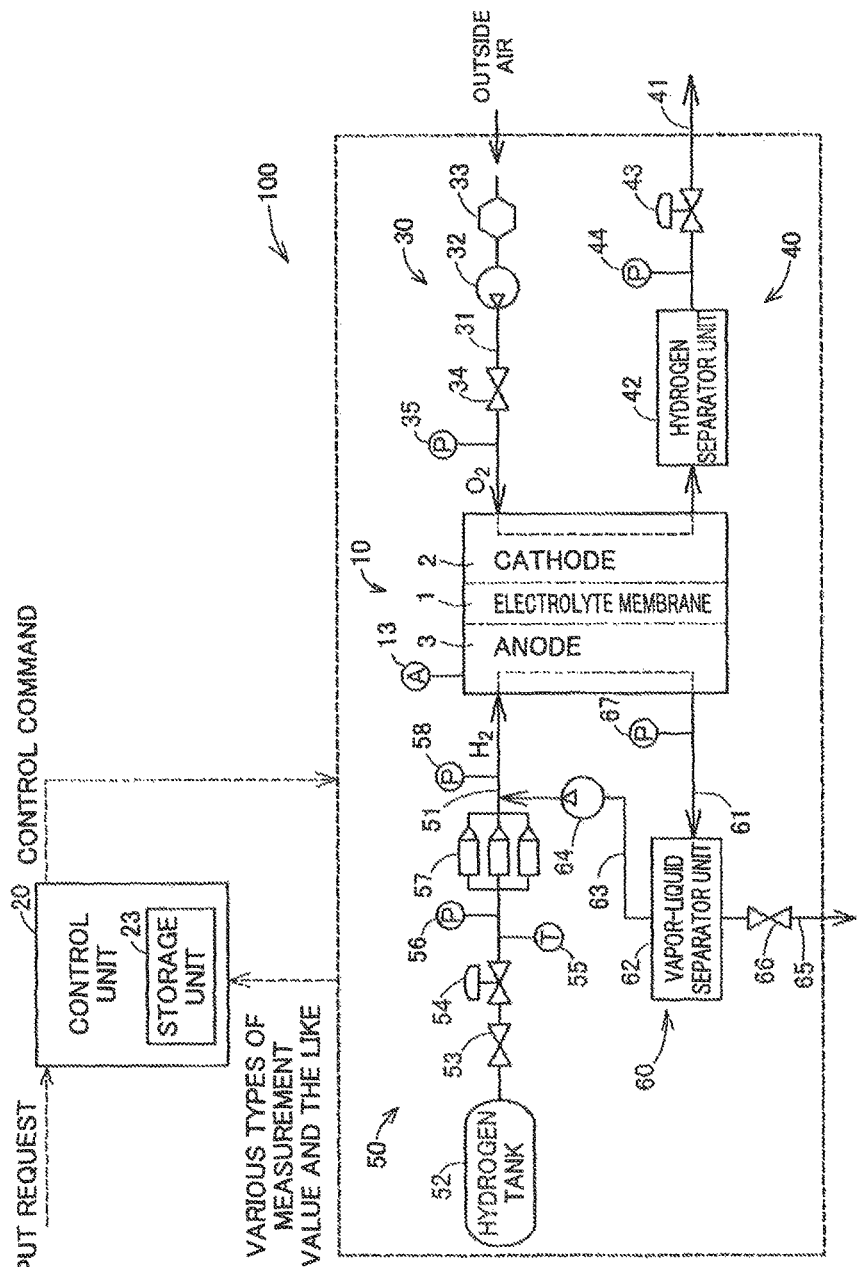
FIG. 1 is a schematic diagram showing the constitution of a fuel cell system with the first embodiment.

FIG. 1 is a schematic diagram showing the constitution of a fuel cell system 100 with the first embodiment. This fuel cell system 100 is for example mounted in a fuel cell vehicle, and supplies power to the vehicle drive motor, electrical components or the like. The fuel cell system 100 is equipped with a fuel cell 10, a control unit 20, a cathode gas supply unit 30, a cathode exhaust gas exhaust unit 40, an anode gas supply unit 50, and an anode gas circulation unit 60.

The fuel cell 10 is a solid polymer electrolyte fuel cell that receives supply of hydrogen as anode gas and oxygen as cathode gas. The fuel cell 10 is equipped with a plurality of power generating bodies that are also called unit cells that are laminated and arranged in series. Each unit cell includes a membrane electrode assembly (MEA) having an electrolyte membrane 1, a cathode 2 arranged on one surface of the electrolyte membrane 1, and an anode 3 arranged on the other surface of the electrolyte membrane 1. In FIG. 1 one unit cell is shown as the fuel cell 10. The electrolyte membrane 1 is a solid polymer electrolyte membrane having good proton conductivity in a wet state, and for example is constituted with a fluorine based ion exchange resin. The cathode 2 and the anode 3 are catalyst electrode layers having gas diffusibility and conductivity, and include a catalyst metal for which electrochemical reactions progress, and a polymer electrolyte having proton conductivity. The catalyst electrode layer is formed as a dry point film of a catalyst ink for which, for example, a platinum carrying carbon and a polymer electrolyte that is the same or similar to electrolyte membrane 1 are dispersed in a solvent. Gas flow paths are formed respectively on both sides of the MEA. The gas flow path is formed, for example, by a separator groove unit or expand metal. Here, the cathode side gas flow path is also called a cathode gas flow path, and the anode side gas flow path is also called the anode gas flow path. A current detection unit 13 is attached to the fuel cell 10. The current detection unit 13 detects a current value $I_G$ of the power generation current of the fuel cell 10 and sends the detection value to the control unit 20.

The control unit 20 is a computer equipped with a CPU, a storage unit 23 including ROM and RAM, and an input/output interface, and controls each structural component of the fuel cell system 100. For example, the control unit 20 receives an output request from outside such as for operation of an accelerator pedal or the like, acquires a detection value based on the output signal from various types of sensor within the system, and issues control commands for having power generation performed by the fuel cell 10 according to that output request to each structural component in the system. The control unit 20 executes a first routine and a second routine described later by having the CPU read a computer program stored in the storage unit 23. The control unit 20 performs calculation of the necessary supply volume and supply timing of hydrogen supplied to the anode 3 of the fuel cell 10 using the first routine and the second routine. As the first routine, the control unit 20 calculates the hydrogen supply volume and injection (supply) time needed for each of a first cycle CT1 (e.g. CT1=16 ms). The supply of the hydrogen is performed by a hydrogen supply device 57. As the second routine, the control unit 20 determines whether or not supply of hydrogen is needed by the hydrogen supply device 57 for each of a second cycle CT2 (e.g. CT2=1 ms) that is shorter than the first cycle CT1. The specific processing contents of the first routine and the second routine are described later.

The cathode gas supply unit 30 supplies high pressure air containing oxygen to the cathode 2 of the fuel cell 10. The cathode gas supply unit 30 is equipped with cathode gas piping 31, an air compressor 32, an air flow meter 33, and a supply valve 34. The cathode gas piping 31 has one end part open to the outside of the fuel cell system 100 via an air filter. The cathode gas piping 31 has the other end part connected to an inlet of a cathode gas flow path of the fuel cell 10 via the air flow meter 33, the supply valve 34, and a pressure detection unit 35. The air compressor 32 supplies high pressure air for which outside air is taken and compressed to the cathode 2 of the fuel cell 10 via the cathode gas piping 31 and the cathode gas flow path. The air flow meter 33 detects the volume of outside air taken by the air compressor 32 and sends that to the control unit 20. The control unit 20 controls the supply volume of air to the cathode 2 by driving the air compressor 32 based on this detection value. The supply valve 34 opens and closes according to the pressure of the cathode gas supplied to the cathode 2, and controls the inflow of high pressure air to the cathode 2. The supply valve 34 is normally in a closed state, and is constituted so as to open when high pressure air of a designated pressure or greater is supplied from the air compressor 32. The pressure detection unit 35 detects the pressure of the cathode gas and sends the detection value to the control unit 20.

The cathode exhaust gas exhaust unit 40 exhausts exhaust gas including unreacted gas and generated moisture that were not used in the power generating reaction with the cathode 2 (hereafter also called "cathode exhaust gas"). The cathode exhaust gas exhaust unit 40 is equipped with cathode exhaust gas piping 41, a hydrogen separator unit 42, an exhaust valve 43, and a pressure detection unit 44. The cathode exhaust gas piping 41 has one end part connected to an outlet of the cathode gas flow path of the fuel cell 10. The cathode exhaust gas piping 41 has the other end part open to the outside of the fuel cell system 100 via the hydrogen separator unit 42, the pressure detection unit 44, and the exhaust valve 43. The hydrogen separator unit 42 separates cross leaked hydrogen from within the cathode exhaust gas. The exhaust valve 43 regulates the pressure of the cathode exhaust gas with the cathode exhaust gas piping 41 (back pressure of cathode 2 side of the fuel cell 10). The exhaust valve 43 has its opening degree regulated by the control unit 20. The pressure detection unit 44 detects the pressure of cathode exhaust gas, and sends the detection values to the control unit 20.

The anode gas supply unit 50 is equipped with anode gas piping 51, a hydrogen tank 52, an opening-closing valve 53, a regulator 54, a primary side pressure detection unit 55, a temperature detection unit 56, a hydrogen supply device 57, and a secondary side pressure detection unit 58. The anode gas piping 51 has one end part connected to the hydrogen tank 52. The anode gas piping 51 has the other end part connected to an inlet of an anode gas flow path of the fuel cell 10 via the opening-closing valve 53, the regulator 54, the primary side pressure detection unit 55, the temperature detection unit 56, the hydrogen supply device 57, and the secondary side pressure detection unit 58. The hydrogen tank 52 supplies stored high pressure hydrogen to the anode 3 of the fuel cell 10 via the anode gas piping 51 and the anode gas flow path. The opening-closing valve 53 is opened and closed by commands from the control unit 20, and controls the inflow of hydrogen to the upstream side of the hydrogen supply device 57 from the hydrogen tank 52. The regulator 54 is a pressure reducing valve for regulating the pressure of hydrogen at the upstream side of the hydrogen supply device 57, and the opening degree is controlled by the control unit 20.

The primary side pressure detection unit 55 detects the internal pressure of the anode gas piping 51 at the upstream side of the hydrogen supply device 57 (upstream side detected pressure value $P_{UM}$), and sends that to the control unit 20. The temperature detection unit 56 detects the internal temperature of the anode gas piping 51 at the upstream side of the hydrogen supply device 57 (detected temperature $T_{UM}$) and sends that to the control unit 20. The secondary side pressure detection unit 58 detects the internal pressure of the anode gas piping 51 at the downstream side of the hydrogen supply device 57 (downstream side detected pressure value $P_{DM}$) and sends it to the control unit 20.

The hydrogen supply device 57 is constituted, for example, by a plurality of injectors which are electromagnetic drive type opening-closing valves. The hydrogen supply device 57 of this embodiment includes three injectors. The number of injectors that the hydrogen supply device 57 contains may also be 1, 2, or 4 or more. With the hydrogen supply device 57, the number of injectors that inject hydrogen gas to the downstream side of the anode gas piping 51, and the injector hydrogen gas injection (supply) time and injection (supply) timing are controlled by control signals output from the control unit 20. The hydrogen supply device 57 of this embodiment is constituted so that it is possible to regulate the flow volume of hydrogen gas supplied to the downstream side of the anode gas piping 51 by changing the number of injectors that spray hydrogen gas. The injector of this embodiment is constituted so as to be able to regulate the volume of hydrogen supplied to the downstream side (hydrogen supply volume) by changing the valve body open time (injection time). The injector may also be constituted so as to regulate the hydrogen supply volume by changing the valve body opening surface area as well as the injection time.

The anode gas circulation unit 60 circulates the anode exhaust gas including unreacted gas (hydrogen, nitrogen and the like) that was not used in the power generating reaction with the anode 3 in the anode 3 of the fuel cell 10. Also, at a preset timing, the anode gas circulation unit 60 exhausts exhaust water and inert gas in the anode exhaust gas to outside. The anode gas circulation unit 60 is equipped with anode exhaust gas piping 61, a vapor-liquid separator unit 62, an anode gas circulation piping 63, a circulation pump 64, anode drainage piping 65, a drainage valve 66, and a pressure detection unit 67.

The anode exhaust gas piping 61 connects the outlet of the anode gas flow path of the fuel cell 10 and the vapor-liquid separator unit 62, and guides anode exhaust gas exhausted from the fuel cell 10 to the vapor-liquid separator unit 62. The pressure detection unit 67 detects the anode exhaust gas pressure (back pressure of the anode 3 side of the fuel cell 10) near the outlet of the fuel cell 10, and sends that to the control unit 20. The control unit 20 controls the hydrogen volume supplied from the hydrogen supply device 57 so that the detection value becomes the target pressure value. The vapor-liquid separator unit 62 separates the vapor components and moisture contained in the anode exhaust gas guided from the anode exhaust gas piping 61, and guides the vapor component to the anode gas circulation piping 63 and guides the moisture to the anode drainage piping 65. The anode gas circulation piping 63 is connected further downstream than the hydrogen supply device 57 of the anode gas piping 51. The circulation pump 64 is provided on the anode gas circulation piping 63, and using the drive force of the circulation pump 64, the hydrogen contained in the vapor component separated with the vapor-liquid separator unit 62 is sent to the anode gas piping 51. The anode drainage piping 65 exhausts the moisture (exhaust water) separated with the vapor-liquid separator unit 62 and the inert gas in the anode exhaust gas to outside the fuel cell system 100. The drainage valve 65 is provided on the anode drainage piping 65, and opens and closes according to commands from the control unit 20.

Though an illustration and detailed description are omitted, the fuel cell system 100 mounted in a fuel cell vehicle is also equipped with a secondary battery and a DC/DC converter for controlling the output voltage of the fuel cell 10 and the charge and discharge of the secondary battery. The secondary battery stores power output by the fuel cell 10 or regenerative power, and functions as a power source together with the fuel cell 10. Each structural component of the fuel cell system 100 described above may be driven even after operation of the fuel cell 10 has stopped by using the power of the secondary battery.

Figure 2:
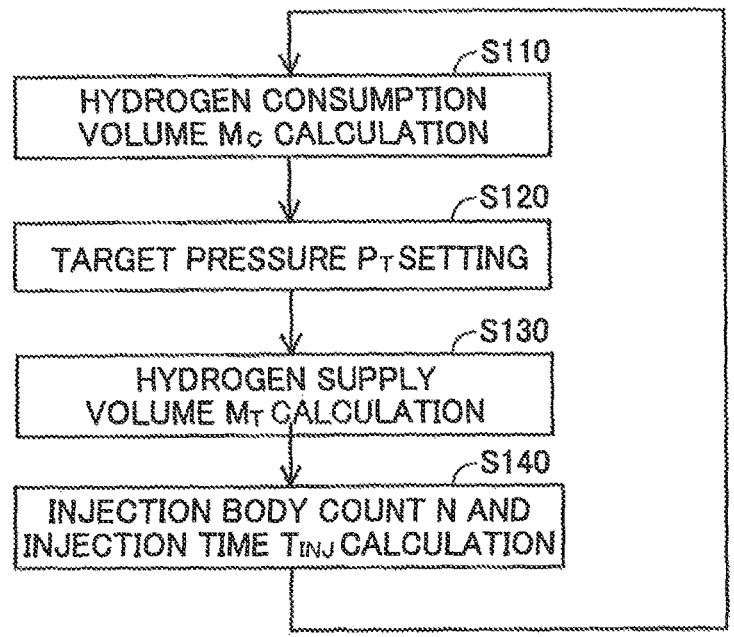
FIG. 2 is a flow chart for describing the processing contents of the first routine.

FIG. 2 is a flow chart for describing the processing contents of the first routine. The control unit 20 repeatedly executes as the first routine the following process for each of a first cycle CT1 (e.g. CT1=16 ms). The control unit 20 first performs calculation of the flow volume of hydrogen gas consumed by the fuel cell 10 (hereafter also referred to as "hydrogen consumption volume $M_C$") based on the operating state of the fuel cell 10 (step S110). Here, as a parameter expressing the operating state of the fuel cell 10, a current value $I_G$ of the power generation current of the fuel cell 10 detected by the current detection unit 13 is used. The control unit 20 may also, for example, calculate a hydrogen consumption volume $M_C$ from the current value $I_G$ using an arithmetic formula expressing the relationship between the current value $I_G$ and the hydrogen consumption volume $M_C$.

Next, the control unit 20 performs setting of the target value of the internal pressure (target pressure value $P_T$) of the anode gas piping 51 at the downstream side of the hydrogen supply device 57 based on the operating state of the fuel cell 10 (step S120). Typically, with fuel cells, it is necessary to have a sufficient hydrogen volume on the anode side. When the hydrogen volume is insufficient, degradation of the MEA occurs due to negative potential. Also, when the hydrogen volume is high, the pressure difference with the cathode side becomes large, and the fuel efficiency worsens due to cross leak occurring. The target pressure value $P_T$ is a target value for avoiding these occurrences. The target pressure value $P_T$ may be calculated from the current value $I_G$ detected by the current detection unit 13. The control unit 20 may also calculate the target pressure value $P_T$ from the current value $I_G$ using a map expressing the relationship of the current value $I_G$ and the target pressure value $P_T$. The control unit 20 stores the calculated target pressure value $P_T$ in the storage unit 23. By doing this, the target pressure value $P_T$ stored in the storage unit 23 is updated with each first cycle CT1.

Next, the control unit 20 performs calculation of the hydrogen supply volume $M_T$ which is the necessary hydrogen injection volume by the hydrogen supply device 57 (step S130). The hydrogen supply volume $M_T$ is calculated by adding the hydrogen consumption volume $M_C$ and the feedback correction volume $M_A$ described later. This feedback correction volume $M_A$ is the flow volume of hydrogen gas added for reducing the deviation between the target pressure value $P_T$ calculated at step S120 and the actual pressure detected by the secondary side pressure detection unit 58 (downstream side detected pressure value $P_{DM}$). The feedback correction volume $M_A$ may be calculated from the deviation between the target pressure value $P_T$ and the downstream side detected pressure value $P_{DM}$. The control unit 20 may also calculate the feedback correction volume $M_A$ using target following type control rules such as PI control or the like.

The control unit 20 calculates the injection body count N of the injectors injecting hydrogen gas and the hydrogen gas injection (supply) time $T_{INJ}$ from the hydrogen supply volume $M_T$ calculated at step S130 (step S140). The injection body count N may be set according to size segments of the hydrogen supply volume $M_T$, for example. The injection time $T_{INJ}$ may be calculated from the hydrogen supply volume $M_T$, the injection body count N, and the static flow volume $M_U$ of the upstream side of the hydrogen supply device 57. The control unit 20 may also calculate the injection time $T_{INJ}$ using a map representing the relationship between the hydrogen supply volume $M_T$, the injection body count N, the static flow volume $M_U$, and the injection time $T_{INJ}$, for example. The static flow volume $M_U$ may also be calculated from the gas state of the upstream side of the hydrogen supply device 57. The control unit 20 may also calculate the static flow volume $M_U$ using an arithmetic formula of the upstream side detected pressure value $P_{UM}$, the detected temperature $T_{UM}$, and the static flow volume $M_U$, for example, it is also possible to add to the injection time $T_{INJ}$ the required time (invalid injection time $T_{IV}$) from when the hydrogen supply device 57 receives a control signal from the control unit 20 until it actually starts injection. The invalid injection time $T_{IV}$ may be calculated from the gas state of the upstream side of the hydrogen supply device 57 and the applied voltage. The control unit 20 may also calculate the invalid injection time $T_{IV}$ using a map representing the relationship between the upstream side detected pressure value $P_{UM}$, the detected temperature $T_{UM}$, the applied voltage, and the invalid injection time $T_{IV}$, for example. The control unit 20 determines the open valve duty (ratio [%] of valve open time with the drive cycle $CT_D$) from the calculated injection time $T_{INJ}$ and the injector drive cycle $CT_D$ (e.g. $CT_D$=50 ms). The control unit 20 stores the calculated open valve duty and the injection body count N in the storage unit 23. By doing this, the open valve duty and the injection body count N stored in the storage unit 23 are updated for each first cycle CT1.

The control unit 20 is constituted so that by repeating the process of steps S110 to S140 noted above, for each first cycle CT1, the target pressure value $P_T$, the open valve duty, and the injection body count N are continuously updated for each first cycle CT1. The open valve duty and the injection body count N are identified from the hydrogen supply volume $M_T$, so the open valve duty and the injection body count N correspond to the broad definition of "hydrogen supply volume." Specifically, the control unit 20 is constituted so that the target pressure value stored in the storage unit 23 and the hydrogen supply volume are continuously updated for each first cycle CT1.

Figure 3:
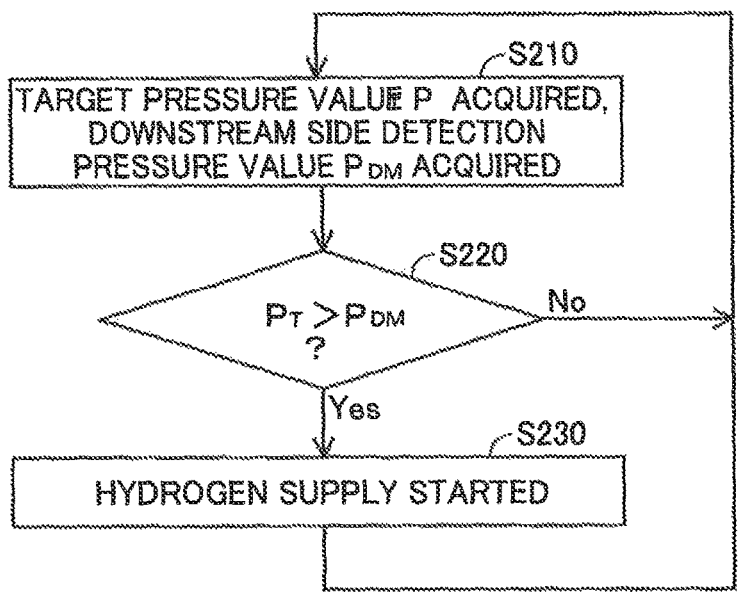
FIG. 3 is a flow chart for describing the processing contents of the second routine.

FIG. 3 is a flow chart for describing the processing contents of a second routine. The control unit 20 repeatedly executes as the second routine the process hereafter for each second cycle CT2 (CT2<CT1, e.g. CT2=1 ms). The control unit 20 first performs acquisition of the target pressure value $P_T$ and the downstream side detected pressure value $P_{DM}$ (step S210). In specific terms, the control unit 20 acquires the newest target pressure value $P_T$ calculated with the first routine from the storage unit 23, and acquires the downstream side detected pressure value $P_{DM}$ from the secondary side pressure detection unit 58.

Next, the control unit 20 performs a judgment of whether or not the acquired downstream side detected pressure value $P_{DM}$ has gone below the acquired target pressure value $P_T$ (step S220). Specifically, the control unit 20 performs a judgment of whether or not it is the timing for which hydrogen supply is required by the hydrogen supply device 57. When the downstream side detected pressure value $P_{DM}$ has not gone below the target pressure value $P_T$, the control unit 20 judges that it is not the timing for which hydrogen supply is required, and again returns to the process of step S210. On the other hand, when the downstream side detected pressure value $P_{DM}$ has gone below the target pressure value $P_T$, the control unit controls the hydrogen supply device 57 and starts the hydrogen supply (step S230). In specific terms, the control unit 20 first acquires the newest open valve duty and injection body count N calculated with the first routine from the storage unit 23. Then, it has the hydrogen supply device 57 start supply of hydrogen with the acquired open valve duty and injection body count N.

The control unit 20 is constituted so that by repeating the processes of steps S210 to S220 noted above, it continues observing whether or not it is the timing for which hydrogen supply is required by the hydrogen supply device 57 for each second cycle CT2. The control unit 20 may also be constituted so as to execute the second routine until the hydrogen supply by the hydrogen supply device 57 is started, or to not execute it after the hydrogen supply has started. Also, the control unit 20 may be constituted so that when it is judged that supply of hydrogen is needed with the second routine, even if hydrogen supply by the hydrogen supply device 57 is not completed, it may have the hydrogen supply device 57 execute the supply of hydrogen with a new hydrogen supply volume (open valve duty and injection body count N).

Conversely, the control unit 20 may also be constituted so that even when it is judged that hydrogen supply is needed with the second routine, it does not have the hydrogen supply device 57 execute the supply of hydrogen with the new hydrogen supply volume until the hydrogen supply is completed. Also, the control unit 20 may be constituted so that a routine other than the second routine is executed during hydrogen supply by the hydrogen supply device 57.

FIG. 4A and FIG. 4B are drawings for describing examples of the effect of this embodiment. FIG. 4 shows an example of time series changes of the downstream side detected pressure value $P_{DM}$, the target pressure value $P_T$, and the lower limit pressure value $P_L$, the calculation cycle of the first routine and the second routine, and the presence or absence of hydrogen injection of the hydrogen supply device 57. FIG. 4A shows an example of a case when the calculation cycle of the first routine and the second routine are the same as the comparison example. FIG. 4B, the same as with this embodiment, shows an example of when the calculation cycle of the second routine is shorter than the calculation cycle of the first routine. Here, the calculation cycle of the first routine of this embodiment and the first routine of the comparison example are equal, and the calculation cycle of the second routine of this embodiment is shorter than that of the second routine of the comparison example.

With this embodiment, the calculation cycle of the second routine is shorter than that of the comparison example, so it is possible to make the time difference ΔT from the time P1 at which the downstream side detected pressure value $P_{DM}$ started actually going below the target pressure value $P_T$ until time P2 at which the control unit 20 detects that shorter than with the comparison example. Because of that, with this embodiment, due to the delay of from when the downstream side detected pressure value $P_{DM}$ when below the target pressure value $P_T$ until hydrogen is sprayed by the hydrogen supply device 57, it is possible to make the volume by which the downstream side detected pressure value $P_{DM}$ goes below the target pressure value $P_T$ (interrupt volume) ΔP smaller than that of the comparison example. Generally, the target pressure value $P_T$ is set to be higher than the actually necessary pressure value in anticipation of this interrupt volume ΔP so as to not have the downstream side detected pressure value $P_{DM}$ go below the lower limit pressure value $P_L$. With this embodiment, it is possible to make this interrupt volume ΔP smaller than with the comparison example, so it is possible to make the adjusted pressure volume PF which is the difference between the lower limit pressure value $P_L$ and the target pressure value $P_T$ smaller than with the comparison example. By doing this, it is possible to set the target pressure value $P_T$ lower than with the comparison example in relation to the same lower limit pressure value $P_L$. The lower the target pressure value $P_T$, the lower the internal pressure of the anode 3 is kept, so with this embodiment, cross leaking to the cathode side is reduced more than with the comparison example, and fuel efficiency is improved. Also, with this embodiment, the constitution is such that the calculation cycle of only the second routine is made relatively short, so with the comparison example, rather than making the calculation cycle of both the first routine and the second routine short, it is possible to inhibit an increase in the load of the CPU.

As described above, with the fuel cell system 100 of this embodiment, the calculation cycle of the first routine that calculates the hydrogen supply volume needed by the hydrogen supply device 57 and the calculation cycle of the second routine for determining whether or not hydrogen supply is necessary (supply timing) are independent. Because of this, it is possible to make the calculation cycle of the second routine relatively short, and while inhibiting the occurrence of degradation of the MEA due to hydrogen deficiency, possible to also inhibit an increase in the load of the CPU by making the calculation cycle of the first routine relatively long. The control unit 20 of this embodiment does not calculate the necessary hydrogen supply volume each time a determination is made of whether or not hydrogen supply is needed by the hydrogen supply device 57 as was the case in the past. The control unit 20 of this embodiment is constituted so as to have hydrogen supply executed by the hydrogen supply device 57 using the newest hydrogen supply volume stored in the storage unit calculated by a separate routine. By doing this, with the control unit 20, it is possible to have the second routine for determining the supply timing be independent from the first routine for calculating the hydrogen supply volume, and to make the calculation cycle of the second routine shorter than the calculation cycle of the first routine.

B. Second Embodiment

Figure 5:
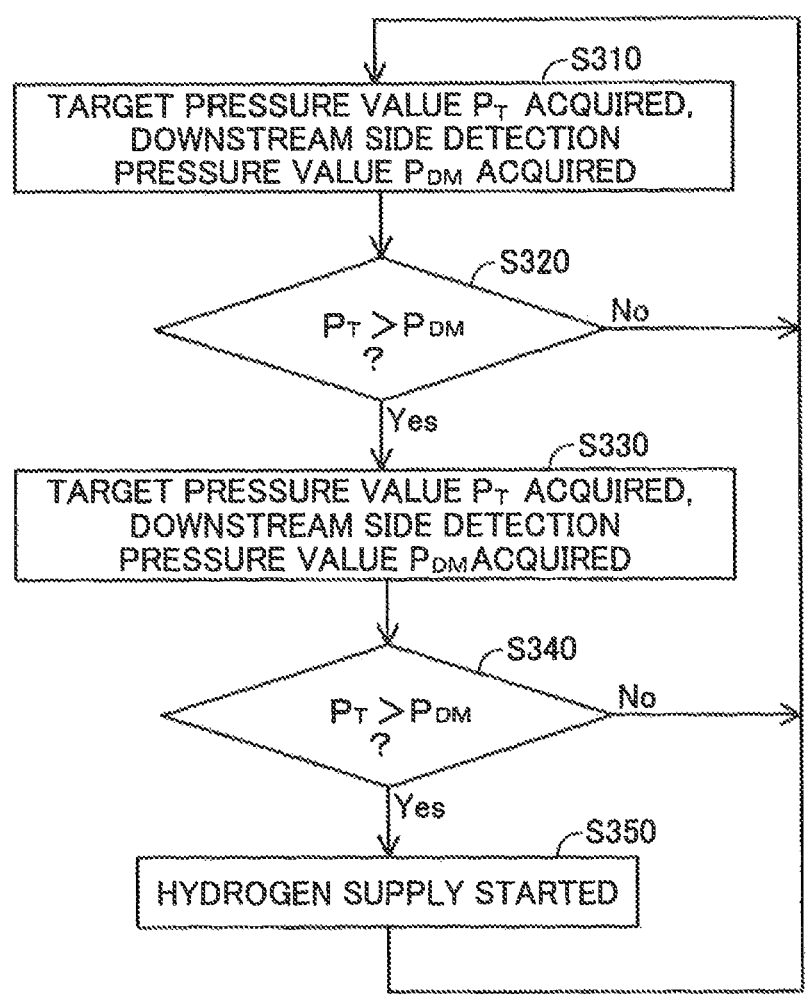
FIG. 5 is a flow chart for describing the second routine of the second embodiment.

FIG. 5 is a flow chart for describing the processing contents of the second routine with a second embodiment. With the second routine of the first embodiment (FIG. 3), the control unit 20 was described as an item that had hydrogen supply by the hydrogen supply device 57 started when the downstream side detected pressure value $P_{DM}$ went below the target pressure value $P_T$ even once. On the other hand, with the second routine of the second embodiment, the control unit 20 starts hydrogen supply by the hydrogen supply device 57 when the downstream side detected pressure value $P_{DM}$ has gone below the target pressure value $P_T$ twice in sequence. In other words, as shown in FIG. 5, when the downstream side detected pressure value $P_{DM}$ acquired at step S310 goes below the acquired target pressure value $P_T$ (step S320: Yes), the control unit 20 again acquires the downstream side detected pressure value $P_{DM}$ and the target pressure value $P_T$ (step S330). Then, when the again acquired downstream side detected pressure value $P_{DM}$ goes below the again acquired target pressure value $P_T$ (step S340: Yes), hydrogen supply by the hydrogen supply device 57 is started (step S350). The control unit 20 is constituted so as to continuously observe whether or not it is the timing when hydrogen supply by the hydrogen supply device 57 is necessary by repeating the processing of steps S310 to S340 noted above.

Figure 6:
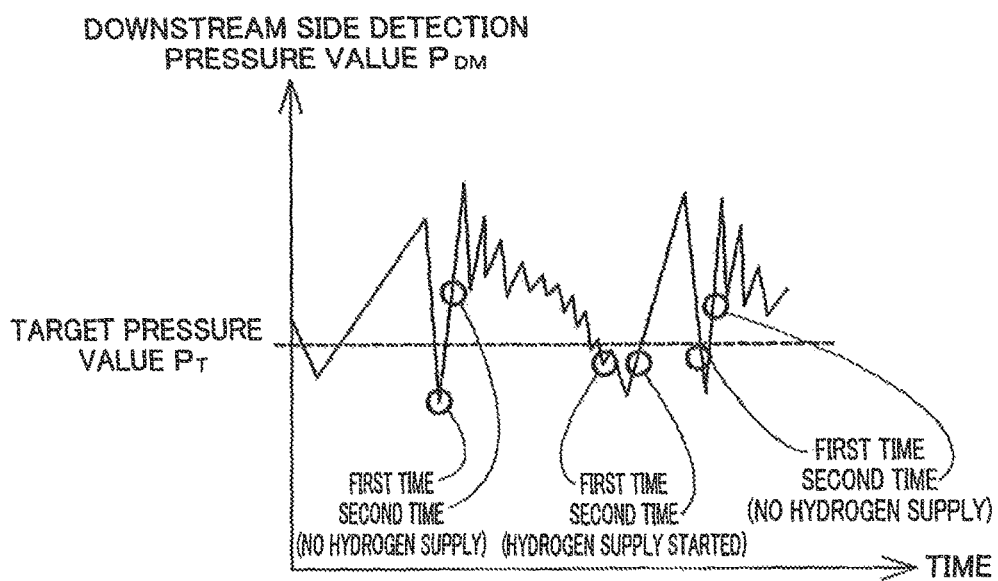
FIG. 6 is a drawing for describing the second routine of the second embodiment.

FIG. 6 is a drawing for describing the hydrogen supply starting timing with the second routine of the second embodiment. The horizontal axis in FIG. 6 shows time, and the vertical axis shows the downstream side detected pressure value $P_{DM}$. FIG. 6 shows an example of the target pressure value $P_T$. After hydrogen supply by the hydrogen supply device 57, the control unit 20 does not have hydrogen supply by the hydrogen supply device 57 started even when the downstream side detected pressure value $P_{DM}$ goes below the target pressure value $P_T$ the first time. The control unit 20 has hydrogen supply by the hydrogen supply device 57 started when the downstream side detected pressure value $P_{DM}$ goes below the target pressure value $P_T$ the second time. By doing this, when the downstream side detected pressure value $P_{DM}$ goes below the target pressure value $P_T$ due to a temporary fluctuation in the internal pressure of the anode gas piping 51, the hydrogen supply by the hydrogen supply device 57 is regulated. By doing this, it is possible to inhibit excessive supply of hydrogen to the hydrogen supply piping. Temporary fluctuations of the internal pressure of the anode gas piping 51 includes a state of the diaphragm of the secondary side pressure detection unit 58 fluctuating when an injector is closed, for example.

Figure 7:
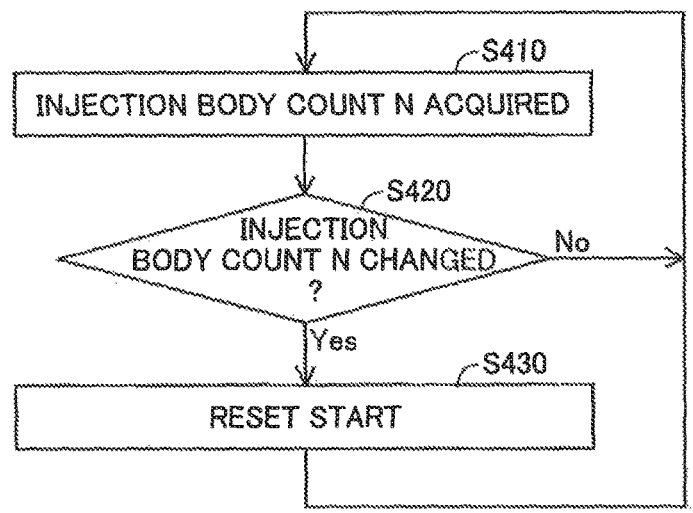
FIG. 7 is a flow chart for describing the processing contents of the third routine.

FIG. 7 is a flow chart for describing the processing contents of a third routine. The control unit 20 of the third embodiment has the following processing executed repeatedly for each of a third cycle CT3 (CT3<CT1, e.g. CT31 ms) as the third routine during hydrogen supply by the hydrogen supply device 57. The control unit 20 first acquires the newest injection body count N calculated with the first routine from the storage unit 23 (step S410). Then, the control unit 20 compares the injector body count N currently being used for the hydrogen supply with the hydrogen supply device 57 and the injection body count N acquired from the storage unit 23, and performs a judgment of whether or not there is a change in the number of units (step S420). When there is no change in the injection body count N, while the control unit 20 has the hydrogen supply device 57 continue to supply hydrogen at the current hydrogen supply volume (open valve duty and injection body count N), it again returns to the process of step S410. On the other hand, when there is a change in the injection body count N, the control unit 20 starts a reset for changing the hydrogen supply volume (step S430). In specific terms, the control unit 20 acquires the newest hydrogen supply volume (open valve duty and injection body count N) from the storage unit 23. Then, it has the hydrogen supply device 57 stop hydrogen supply using the current hydrogen supply volume, and has it execute hydrogen supply at the acquired new hydrogen supply volume. The control unit 20 is constituted so as to continue observing whether or not it is necessary to change the hydrogen supply volume by the hydrogen supply device 57 at each of the third cycle CT3 by repeating the processing of steps S410 to S420 noted above.

FIG. 8 is a drawing for describing an example of the effects of this embodiment. FIG. 8 shows an example of time series changes in the downstream side detected pressure value $P_{DM}$, the target pressure value $P_T$, and the lower limit pressure value $P_L$, the calculation cycle of the first routine, the second routine, and the third routine, and the presence or absence of hydrogen injection of the hydrogen supply device 57 and the injection contents. The control unit 20 executing the second routine detects that the downstream side detected pressure value $P_{DM}$ has gone below the target pressure value $P_T$ at point in time P2. After that, the control unit 20 has the hydrogen supply device 57 inject hydrogen of the hydrogen supply volume (first hydrogen supply volume) acquired from the storage unit 23. Here, the injection body count N included in the first hydrogen supply volume is 1. The control unit 20 executing the first routine newly calculates the hydrogen supply volume (second hydrogen supply volume) at point in time P3. The injection body count N included in the second hydrogen supply volume is 2. The control unit 20 executing the third routine detects that the injection body count N has changed from 1 to 2 at point in time P4. Then, it has the hydrogen supply device 57 stop hydrogen injection at the first hydrogen supply volume and start hydrogen injection at the second hydrogen supply volume. By doing this, it is possible to more quickly eliminate the state of the downstream side detected pressure value $P_{DM}$ going below the target pressure value $P_T$, and possible to inhibit the occurrence of degradation of the MEA due to hydrogen deficiency. For example, we may consider a case when the target pressure value $P_T$ rapidly rises during injection of hydrogen by the hydrogen supply device 57. In this case, when the injection of the hydrogen supply volume based on the target pressure value $P_T$ before the rapid rise continues until the injector drive cycle $CT_D$ ends continues, a low pressure state continues due to insufficient supply volume, and there is the risk of the anode having a hydrogen deficiency. On the other hand, with this embodiment, even if there is a rapid rise in the target pressure value $P_T$ during hydrogen injection, it is possible to quickly perform supply of hydrogen corresponding to the target pressure value $P_T$ after the rapid rise, so it is possible to reduce the occurrence of hydrogen deficiency.

D. Modification Examples

The present invention is not limited to the embodiments or working examples of this specification, and may be realized with various constitutions within a scope that does not stray from its gist. At least a portion of the functions and processes realized using software with the embodiments noted above may also be realized using hardware. Also, at least a portion of the functions and processes realized using hardware may be realized using software. As hardware, for example, it is possible to use various types of circuits (circuitry), such as integrated circuits, discrete circuits, or circuit modules combining those circuits, for example. The following kinds of modifications are also possible, for example.

D-1. Modification Example 1

The control unit 20 may also repeatedly execute a fourth routine during hydrogen supply by the hydrogen supply device 57. The fourth routine is a process by which when a supply stop request is received, the control unit has the hydrogen supply device 57 stop the supply of hydrogen even when the hydrogen supply by the hydrogen supply device 57 is not completed. The fourth routine is preferably performed at a fourth cycle CT4 that is shorter than the first cycle CT1 (CT4<CT1, e.g. CT4=1 ms). The conventional control unit, when it received a supply stop request, stopped the next hydrogen supply after the hydrogen supply by the hydrogen supply device 57 was completed. However, in this case, even after the supply stop request is received, the supply of hydrogen continues for a while, so the anode pressure becomes higher than is necessary, and there was the problem that cross leak occurred and fuel efficiency worsened. By the control unit 20 executing the fourth routine, after the supply stop request is received, it is possible to quickly stop the supply of hydrogen, so it is possible to inhibit the occurrence of cross leak.

D-2. Modification Example 2

With FIG. 4 and FIG. 8, the first routine processing operation and the second routine processing operation are shown so as to have the timing skewed. Specifically, the first routine processing operation and the second routine processing operation are shown so as to not have the process start simultaneously. However, the constitution may also be such that the first routine processing operation may also be made to have its processing always start simultaneously with the second routine processing operation.

What is claimed is:

1. A fuel cell system comprising:
a fuel cell,
a hydrogen supply unit configured to supply hydrogen to the fuel cell via hydrogen supply piping,
a pressure detection unit configured to detect a pressure value of the internal pressure of the hydrogen supply piping,
a current detection unit configured to detect current value of the power generation current of the fuel cell, and
a control unit configured to
calculate necessary hydrogen supply volume for the fuel cell based on the detected current value and the pressure value, and
control the hydrogen supply unit to supply hydrogen corresponding to the calculated hydrogen supply volume to the fuel cell,
wherein the control unit is configured to
calculate the hydrogen supply volume based on the pressure value and the current value for each of a first cycle, and
acquire the pressure value for each of a second cycle and supply hydrogen corresponding to the immediately prior calculated hydrogen supply volume to the fuel cell when the control unit determines that supply of hydrogen is necessary based on the acquired pressure value, wherein the second cycle is shorter than the first cycle.

2. A fuel cell system, comprising:
a fuel cell,
a hydrogen supply unit configured to supply hydrogen to the fuel cell via hydrogen supply piping,
a pressure detection unit configured to detect a pressure value of the internal pressure of the hydrogen supply piping,
a current detection unit configured to detect current value of the power generation current of the fuel cell, and
a control unit configured to
execute a first routine for each of a first cycle, wherein the first routine acquires the current value and the pressure value, calculates necessary hydrogen supply volume by the hydrogen supply unit from the acquired current value and pressure value, and updates the hydrogen supply volume stored in the storage unit using the calculated hydrogen supply volume, and
execute a second routine for each of a second cycle which is shorter than the first cycle, wherein the second routine acquires the pressure value, judges whether or not hydrogen supply by the hydrogen supply unit is necessary from the acquired pressure value, and when the control unit judges that supply of hydrogen is necessary, acquires the hydrogen supply volume from the storage unit, and has the hydrogen supply unit start the supply of hydrogen corresponding to the acquired hydrogen supply volume.

3. The fuel cell system according to claim 2,
wherein the control unit is configured to:
with the first routine, calculate a target pressure value for the internal pressure of the hydrogen supply piping from the acquired current value, and update the target pressure value stored in the storage unit using the calculated target pressure value, for each of the first cycle, and
with the second routine, acquire the target pressure value from the storage unit, and judge whether or not hydrogen supply by the hydrogen supply unit is necessary based on whether or not the pressure value acquired from the pressure detection unit has gone below the acquired target pressure value, for each of the second cycle.

4. The fuel cell system according to claim 3,
wherein with the second routine, when the pressure value acquired from the pressure detection unit goes below the acquired target pressure value, the control unit is configured to again acquire the pressure value and the target pressure value, and when the pressure value acquired again goes below the target pressure value acquired again, judge that hydrogen supply by the hydrogen supply unit is necessary.

5. The fuel cell system according to claim 2,
wherein when the control unit is configured to
control the hydrogen supply unit to execute supplying of hydrogen corresponding to a first hydrogen supply volume acquired from the storage unit, and
execute a third routine for each of a third cycle which is shorter than the first cycle, wherein with the third routine, the control unit acquires the hydrogen supply volume from the storage unit, judges whether or not a second hydrogen supply volume which is the acquired hydrogen supply volume has changed by a preset threshold value or greater in relation to the first hydrogen supply volume, and when the control unit judges that the second hydrogen supply volume has changed by the threshold value or greater, even if the supply of hydrogen corresponding to the first hydrogen supply volume by the hydrogen supply unit is not completed, the control unit has the hydrogen supply unit start supply of hydrogen corresponding to the second hydrogen supply volume.

* * * * *